(12) United States Patent
Ukigaya

(10) Patent No.: US 6,816,303 B2
(45) Date of Patent: Nov. 9, 2004

(54) OPTICAL MODULATOR AND METHOD OF MANUFACTURING THE SAME

(75) Inventor: Nobutaka Ukigaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/454,468

(22) Filed: Jun. 5, 2003

(65) Prior Publication Data

US 2004/0057104 A1 Mar. 25, 2004

(30) Foreign Application Priority Data

Jun. 11, 2002 (JP) ......................................... 2002-170572
Feb. 26, 2003 (JP) ......................................... 2003-050000

(51) Int. Cl.[7] ........................... G02B 26/00; G09G 3/34; G09G 3/16
(52) U.S. Cl. ........................ 359/296; 359/297; 345/107; 345/48; 345/84
(58) Field of Search ................................ 359/296, 297; 345/107, 48, 84

(56) References Cited

U.S. PATENT DOCUMENTS 3,612,758 A   10/1971  Evans et al. ............. 178/5.4 R
6,113,810 A  * 9/2000  Hou et al. .................. 252/572
6,271,823 B1 * 8/2001  Gordon et al. .............. 345/107
6,693,621 B1 * 2/2004  Hayakawa et al. .......... 345/107

FOREIGN PATENT DOCUMENTS

JP              1-248183        10/1989

* cited by examiner

*Primary Examiner*—Timothy Thompson
(74) *Attorney, Agent, or Firm*—Fitzpatrick, Cella, Harper & Scinto

(57) ABSTRACT

An optical modulator includes a first substrate, a second substrate arranged with a predetermined gap interposed between itself and the first substrate, and partition wall members partitioning pixels arranged between the substrates. A liquid and a plurality of charged particles are arranged at each of the pixels. The optical modulator is manufactured by forming the partition walls on the second substrate, placing the liquid and the electrically charged particles in the recesses defined by the second substrate and the partition wall members, placing the perforated member on the partition wall members to confine the charged particles in the recesses, and arranging a blind member so as to close the perforations of the perforated member. With this method charged particles are prevented from flowing out of the pixels in the manufacturing process.

12 Claims, 6 Drawing Sheets

OPTICAL MODULATOR AND METHOD OF MANUFACTURING THE SAME

BACKGROUND OF THE INVENTION

1. Field of the Invention

This invention relates to an optical modulator adapted to optically modulate a signal by moving electrically charged particles in liquid and also to a method of manufacturing such an optical modulator.

2. Related Background Art

Recently, optical modulators adapted to utilize the electrophoresic phenomenon of electrically charged particles in liquid have been proposed and are expected to find applications in the field of image displays and optical shutters. A known optical modulator for displaying images (to be referred to as electrophoresic display apparatus hereinafter) will be described below as an example of such applications.

In line with the recent technological developments for information devices, there is an increasing demand for energy-saving thin display apparatus. Efforts have been and being paid for research and development in the field of such display apparatus in order to meet the demand. Particularly, liquid crystal display apparatus have been made commercially available as a result of massive development activities. However, currently available liquid crystal display apparatus are still accompanied by certain problems to be solved satisfactorily yet including that the characters on the display screen can be read only with difficulty depending on the viewing angle of the viewer and the amount of light reflected by the screen and that the visual sense of the viewer can be stressed by flickering of the light source and a low luminance level of the displayed image. Under these circumstances, reflection type display apparatus seem to be promising from the viewpoint of low power consumption rate and low stress to the visual sense.

Electrophoresic display apparatus that utilize the electrophoresic phenomenon of electrically charged particles in liquid have been proposed as such display apparatus (see, inter alia, U.S. Pat. No. 3,612,758).

An electrophoresic display apparatus comprises a pair of substrates including an upper substrate and a lower substrate arranged with a predetermined gap interposed between them, insulating liquid filled in the gap between the substrates, a large number of electrically charged electrophoresic particles dispersed in the insulating liquid and display electrodes arranged at respective pixels along the substrates. Partition walls are arranged between adjacently located pixels in order to separate the pixels and prevent the charged electrophoresic particles of a pixel from moving to another so that a uniform concentration of charged electrophoresic particles may be maintained.

Techniques for reliably injecting insulating liquid and charged electrophoresic particles have also been disclosed. Specifically, a technique of arranging holes to be used for injecting liquid to be distributed at positions on the rear surface electrode plate corresponding to the respective holes of a holed spacer and a technique of filling the inside of each pixel with liquid to be distributed by way of a hole arranged on the rear surface electrode plate and sealing the hole by means of a sealing member in the final manufacturing step are known (see, inter alia, Japanese Patent Application Laid-Open No. 1-248183).

A typical conventional method of manufacturing an electrophoresic display apparatus comprises:

forming display electrodes and other related components on a lower substrate;
forming partition walls between adjacent pixels;
an amount of insulating liquid and a substantially equivalent amount of electrically charged particles are filled into each of the recess defined by the partition walls; and
bonding an upper substrate to the partition walls.

When an upper substrate is bonded to the partition walls, insulating liquid is forced out from each recess. At this time, electrically charged particles can also be forced out with insulating liquid. Then, the pixels may not contain a substantially equal amount of charged particles to consequently degrade the quality of the displayed image.

SUMMARY OF THE INVENTION

Therefore, the object of the present invention is to provide an optical modulator that can avoid the above identified problem and also a method of manufacturing such an optical modulator.

The present invention is made by taking the above described circumstances into consideration. In an aspect of the present invention, there is provided an optical modulator comprising a first substrate, a second substrate arranged with a predetermined gap interposed between itself and the first substrate, partition wall members partitioning pixels arranged between the substrates, a liquid and a plurality of electrically charged particles arranged at each of the pixels, and first and second electrodes arranged at each of the pixels, the charged particles being adapted to be moved to display an image or operate for optical switching as a result of application of a voltage between the electrodes of each pixel, wherein the first substrate is formed by combining a perforated member having perforations and arranged so as to be held in contact with the partition wall members, the perforations allowing passage of the liquid while obstructing passage of the particles, and a blind member arranged so as to close the perforations.

In another aspect of the invention, there is provided a method of manufacturing an optical modulator comprising a first substrate, a second substrate arranged with a predetermined gap interposed between itself and the first substrate, partition wall members partitioning pixels arranged between the substrates, a liquid and a plurality of charged particles arranged at each of the pixels, and first and second electrodes arranged at each of the pixels, the method comprising a step of forming the partition wall members on the second substrate, a step of placing the liquid and the electrically charged particles in recesses defined by the second substrate and the partition wall members, a step of placing a perforated member on the partition wall members to confine the charged particles in the recesses, and a step of arranging a blind member so as to close the perforations of the perforated member.

DETAILED DESCRIPTION OF THE INVENTION

Now, the present invention will be described by referring to the accompanying drawings that illustrate preferred embodiments of the invention.

Figure 1A:
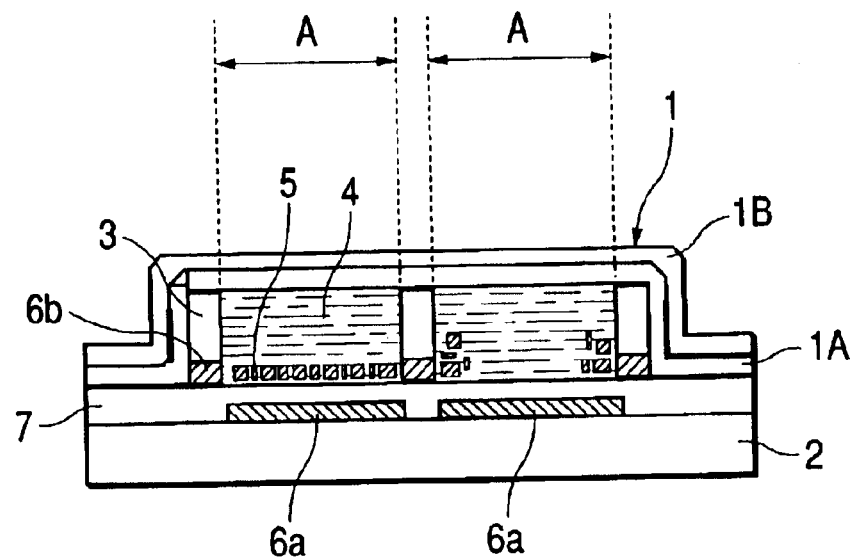
FIGS. 1A and 1B are schematic illustrations of the operation of an optical modulator according to the invention.
Figure 1B:
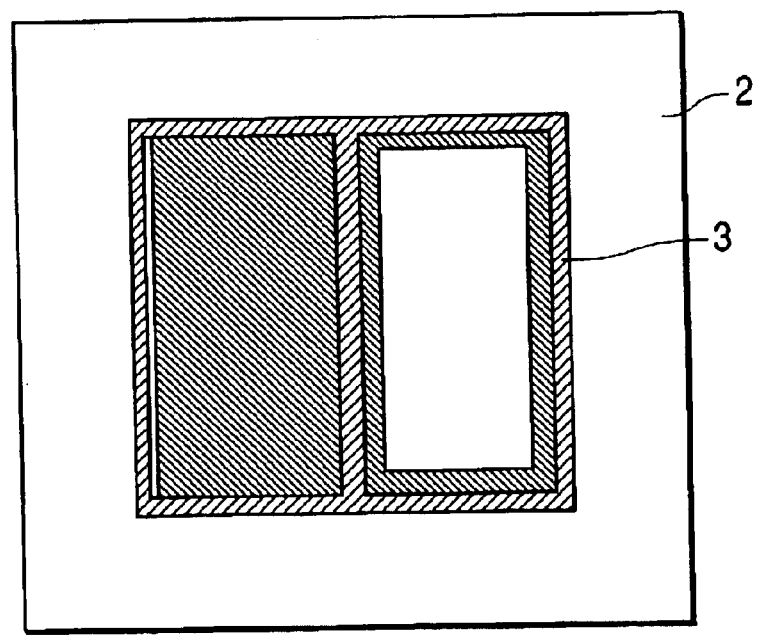

FIGS. 1A and 1B are a schematic cross sectional view and a schematic plan view of an embodiment of an optical modulator according to the invention, which is an electrophoretic display apparatus.

As shown in FIGS. 1A and 1B, this embodiment of optical modulator comprises a pair of substrates including a first substrate 1 and a second substrate 2 that are arranged with a predetermined gap interposed between them, partition wall members 3 partitioning pixels A arranged between the substrates 1 and 2, a liquid 4 and a plurality of charged particles 5 arranged at each of the pixels A, first electrodes 6a and second electrodes 6b arranged at the respective pixels A. As a voltage is applied between the electrodes 6a and 6b of each pixel A, the charged particles 5 are moved to display an image or operate for optical switching. In FIG. 1A, reference symbol 7 denotes an insulating layer typically made of acrylic resin.

When the embodiment is used for displaying an image, the second electrode 6b is arranged under the partition wall members 3 while the first electrode 6a is arranged along the second substrate 2 for each pixel A as shown in FIG. 1A. For each pixel, the surface of the first electrode 6a is made to appear white, whereas the charged particles 5 are made to appear black. When the charged particles 5 are attracted to the second electrode 6b, the surface of the first electrode 6a becomes visible to display white (the right side pixel). On the other hand, when the charged particles 5 are attracted to the first electrode 6a, they become visible to display black (the left side pixel). Colors other than black and white may also be used. Color images can be displayed when the charged particles 5 are made to appear black and the surfaces of each set of three first electrodes 6a are made to appear red, green and blue respectively.

Figure 2:
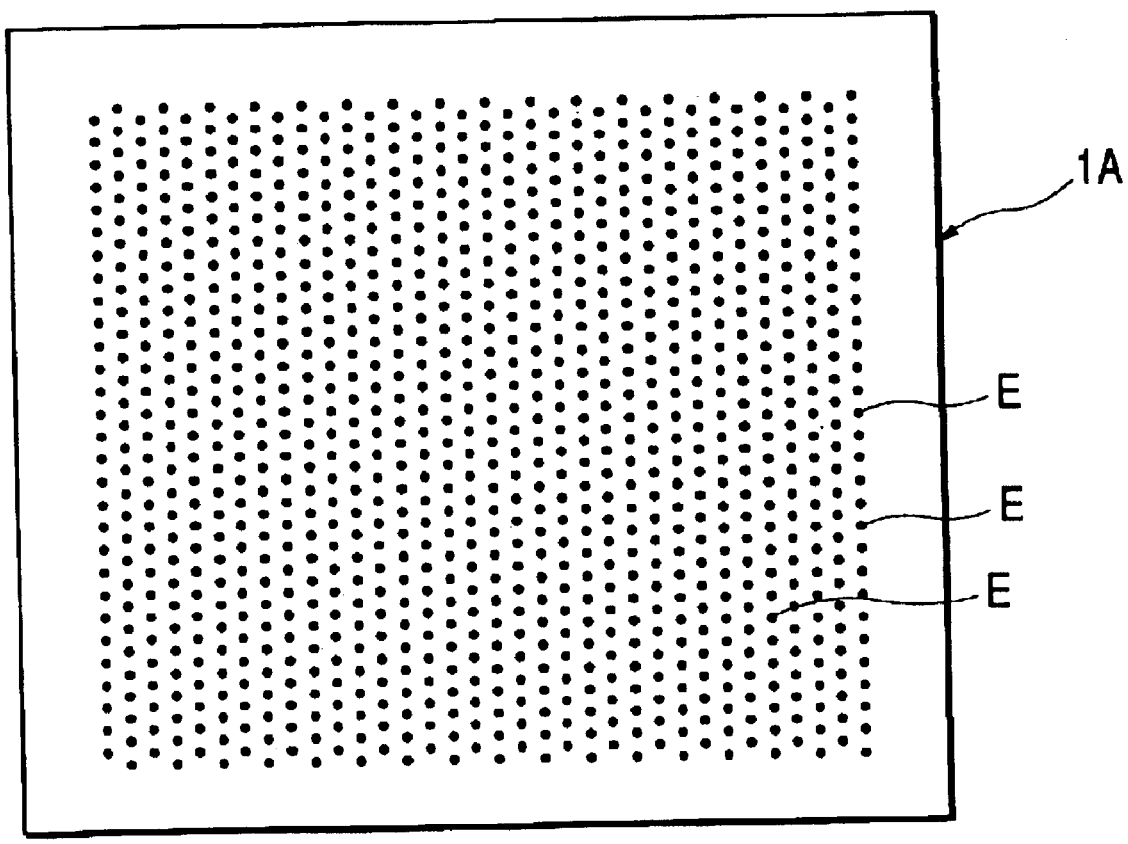
FIG. 2 is a schematic plan view of a perforated member that can be used for the purpose of the invention.

In this embodiment, the first substrate 1 is formed by combining a perforated member 1A having perforations E that is arranged so as to be held in contact with the partition wall members 3 and a blind member 1B arranged so as to close the perforations E as shown in FIGS. 1A, 1B and 2.

FIG. 2 is a schematic plan view of the perforated member 1A. It is preferable that the perforations are arranged at a uniform density. More specifically, at least a perforation is provided for each pixel A. It is preferable that two or more than two perforations are provided for each pixel A. It is preferable that the perforated member 1A has a thickness smaller than the width of each pixel A, smaller than the height of the partition wall members 3 and also smaller than the width of each partition wall member 3. A highly electrically conductive material may be used for the perforated member 1A (as will be described in greater detail hereinafter). An adhesive agent may be applied to it in advance so as to bond it to the partition wall members 3 (as will be described in greater detail hereinafter). A liquid absorbing member as indicated by reference symbol 20 in FIG. 4A and reference symbols 30, 31 in FIGS. 5A and 5B may be arranged on the perforated member 1A (as will be described in greater detail hereinafter).

The size of each perforation E is preferably such that the liquid 4 may smoothly pass through it but a charged particle 5 may not be able to pass through it. How to regulate the size of the perforations E will be discussed below.

The size of the perforations E has to be designed appropriately depending on the volume of the space each pixel has, the diameter of each charged particle, the viscosity of the insulating liquid, if a process of applying a voltage to the electrodes arranged in the pixel region is used simultaneously when the perforated member 1A having perforations E is arranged and so on.

On the other hand, the blind member 1B may be a smooth and flat plate-shaped member. Alternatively, it may be a member to which a pasty material that can be forced into the perforations E is applied and hardened.

While both the first electrodes 6a and the second electrodes 6b are arranged at the side of the second substrate 2 in the drawings, the present invention is by no means limited to such an arrangement. Alternatively, they may be arranged at the side of the first substrate or divided so as to be arranged both at the side of the first substrate and at the side of the second substrate.

Now, the components of the embodiment will be described further.

The perforated member 1A, the blind member 1B and the second substrate 2 may be formed by using a plastic film such as polyether-sulfone (PES), polyethylene terephthalate (PET), polycarbonate (PC) or norbornene or by using a hard substrate such as glass substrate or quartz substrate. They may alternatively be formed, using a colored or opaque substrate made of for example polyimide (PI) or a metal such as stainless steel. However, at least either the first substrate 1 (the perforated member 1A and the blind member 1B) or the second substrate 2 needs to be transparent. When both the perforated member 1A and the blind member 1B are transparent, preferably they show a substantially same refractive index. More specifically, the difference between their refractive indexes is not greater than 0.1.

Any electrically conductive material may be used for forming the first electrode 6a and the second electrode 6b so long as the material can be subjected to a patterning operation. Materials that can be used for the electrodes include metals such as chromium (Cr), aluminum (Al) and copper (Cu), carbon, silver paste and electrically conductive organic film. When the first electrode 6a is utilized as light reflecting layer, a material showing a high reflectance such as silver (Ag) or aluminum (Al) is preferably used. When the first electrode 6a is used for displaying white, its surface is made to have undulations or a light diffusing layer is formed on the electrode so that light reflected by the surface may be diffused.

Any material that can be subjected to a patterning operation may be used for the partition wall members 3. Materials that can be used for the partition wall members 3 include acrylic resin and epoxy resin that are photosensitive.

A member having surface energy different from that of the liquid 4 (made of a material that is not dissolved into the liquid 4 such as cellulose or PVA) may preferably be arranged on each partition member 3.

The liquid 4 is preferably a transparent nonpolar solvent such as isoparaffin, silicone oil, xylene or toluene.

A colored material that shows good electric charge characteristics with positive or negative polarity in the liquid 4 is preferably used for the electrically charged particles 5. Examples of materials that can be used for the charged particles 5 include various inorganic pigments, organic pigments, carbon black and resins containing any of such materials. While charged particles having a diameter between 0.01 $\mu$m and 50 $\mu$m may be used for the purpose of the invention, it is preferable to use charged particles having a diameter between 0.1 and 10 $\mu$m.

An electric charge control agent is preferably added to the liquid 4 and/or the charged particles 5 in order to stabilize the electric charges of the charged particles 5. Examples of electric charge control agents that can be used for the purpose of the invention include succinimide, metal complexes of monoazo dyes, salicylic acid, organic quaternary ammonium salts and nigrosine compounds.

A dispersant may be added to the liquid 4 in order to prevent agglomeration of charged particles 5 and maintain a dispersed state for them. Examples of dispersants that can be used for the purpose of the invention include polyvalent metal salts of phosphoric acid such as calcium phosphate and magnesium phosphate, carbonates such as calcium carbonate, other inorganic salts, inorganic oxides and organic polymers.

The above described optical modulator may be used as a display apparatus for displaying images or as optical shutter for an optical switching operations.

Now, a method of manufacturing the above described embodiment of optical modulator will be described by referring to FIGS. 3A through 3C.

Figure 3A:
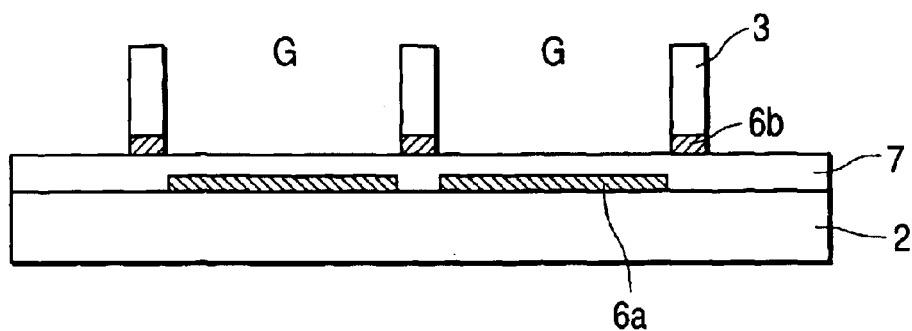
FIGS. 3A, 3B and 3C are schematic illustrations of a mode of carrying out a method of manufacturing an optical modulator according to the invention.
Figure 3B:
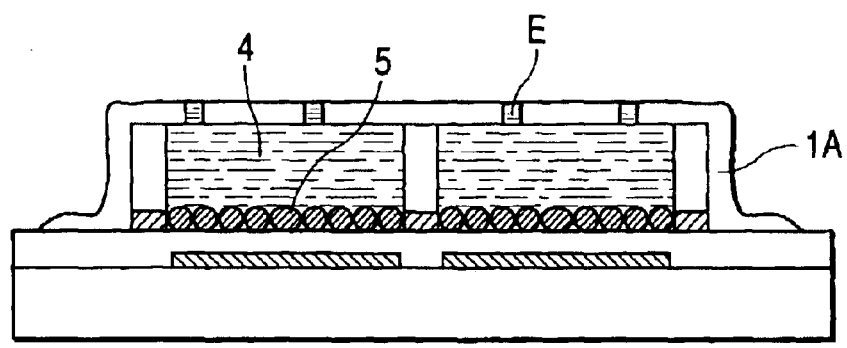
Figure 3C:
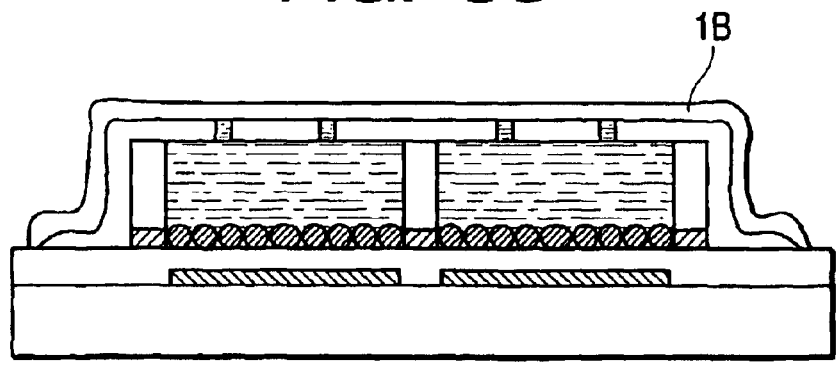

A method of manufacturing the above embodiment of optical modulator comprises:

a step of forming partition wall members 3 on a second substrate 2 (see FIG. 3A);

a step of arranging the second substrate 2 so as to locate the partition wall members 3 above the second substrate 2 and placing a liquid 4 and electrically charged particles 5 in the recesses G defined by the second substrate 2 and the partition wall members 3;

a step of placing a perforated member 1A on the partition wall members 3 to confine the charged particles 5 in the recesses G (see FIG. 3B); and a step of arranging a blind member 1B so as to close the perforations E of the perforated member 1A (see FIG. 3C).

When the perforated member 1A is placed on the partition wall members 3, some of the liquid 4 contained in the recesses G may flow out through the perforations E but the charged particles 5 cannot pass through the perforations E so that they are forced to remain in the insides of the recesses G.

Figure 6A:
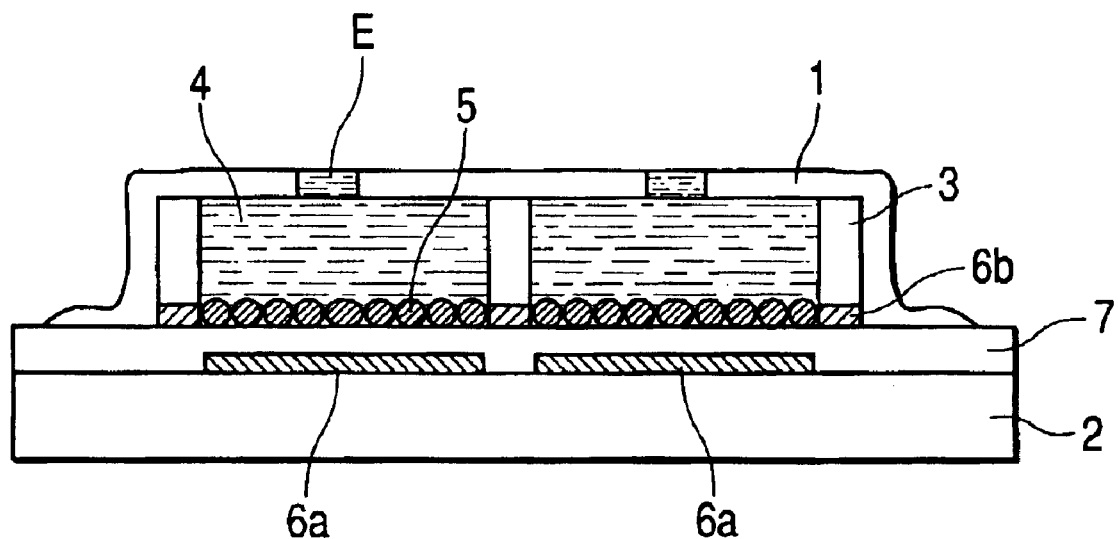
FIGS. 6A and 6B are schematic illustrations of still another mode of carrying out a method of manufacturing an optical modulator according to the invention.
Figure 6B:
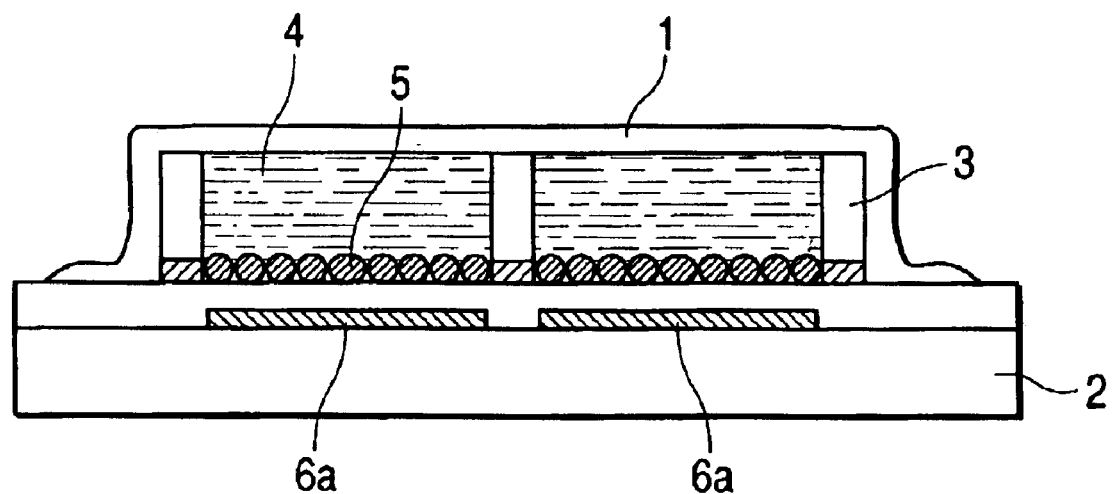

The material of the first substrate 1 can be so selected as to bear perforations in a state of being not soaked with the liquid but close the perforations in a state of being soaked with the liquid (see reference symbol 1 in FIGS. 6A and 6B) and the method of manufacturing the optical modulator may comprise:

a step of forming the partition wall members 3 on the second substrate 2 (see FIG. 6B);

a step of arranging the second substrate 2 so as to locate the partition wall members 3 above the second substrate 2 and placing the liquid 4 and the electrically charged particles 5 in the recesses G defined by the second substrate 2 and the partition wall members 3 (see FIG. 6A);

a step of placing the first substrate 1 in a state of bearing perforations E on the partition wall members 3 to confine the charged particles 5 in the recesses G (see FIG. 6A); and a step of closing the perforation E as a result of causing the first substrate 1 placed on the partition wall members 3 to be soaked with the liquid 4 (see FIG. 6B).

Preferably, liquid 4 is placed in the recesses G by such an amount that it slightly overflows from the recesses G. Techniques that can be used for placing liquid 4 and electrically charged particles 5 in the recesses G include the following:

(i) a technique of placing liquid 4 (or both liquid 4 and charged particles 5) in a container and immerse the second substrate in the liquid 4 contained in the container;

(ii) a technique of supplying liquid 4 and charged particles 5 by way of a nozzle without using such a container; and (iii) a technique of applying liquid 4 and charged particles 5 by printing.

When either of the techniques (ii) and (iii) is used, liquid 4 and charged particles 5 may be supplied simultaneously or separately.

When a plurality of recesses G are used, it is necessary to make them contain substantially a same number of charged particles 5. Techniques that can be used for causing the recesses G to contain a same number of charged particles 5 include the following:

a technique of taking a given number of charged particles 5 in advance, put them in a recess G and repeating the above procedure; and a technique of taking a given amount of liquid 4 containing charged particles 5 to an excessive concentration under a set of predetermined conditions in terms of voltage, time and so on, put it in a recess G and repeating the above procedure.

Figure 4A:
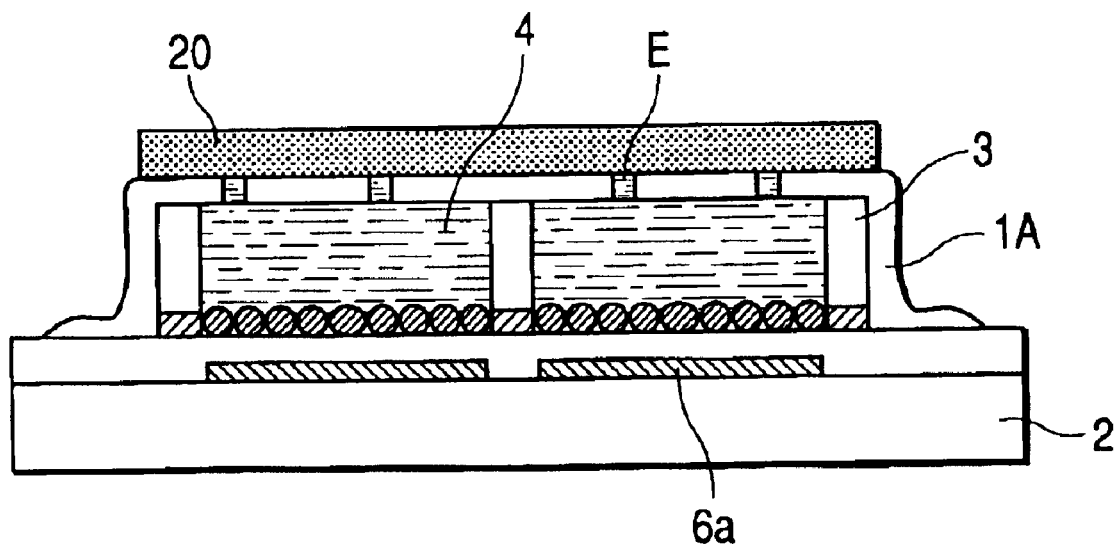
FIGS. 4A and 4B are schematic illustrations of another mode of carrying out a method of manufacturing an optical modulator according to the invention.
Figure 4B:
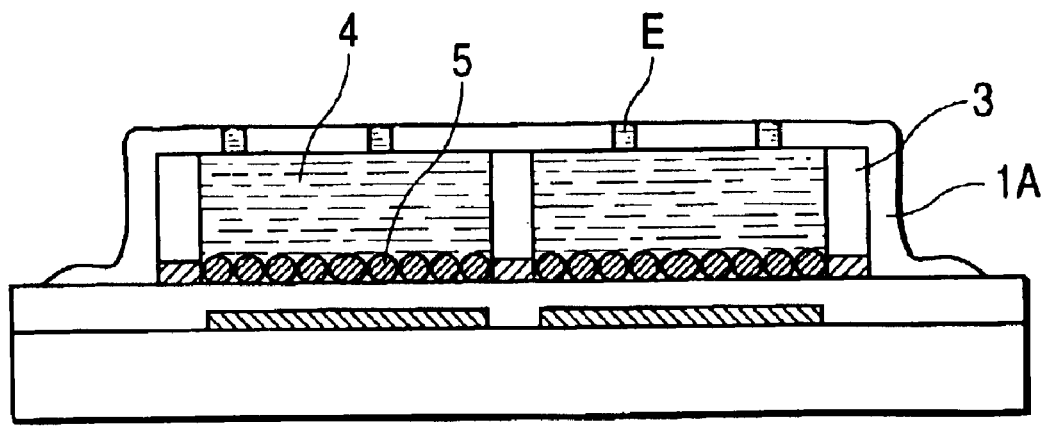
Figure 5A:
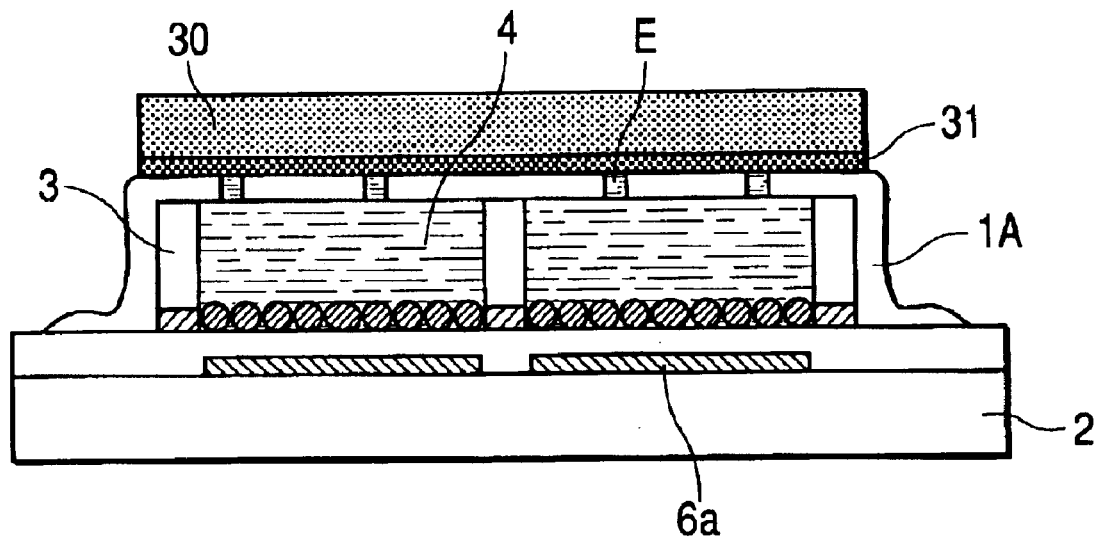
FIGS. 5A and 5B are schematic illustrations of still another mode of carrying out a method of manufacturing an optical modulator according to the invention.
Figure 5B:
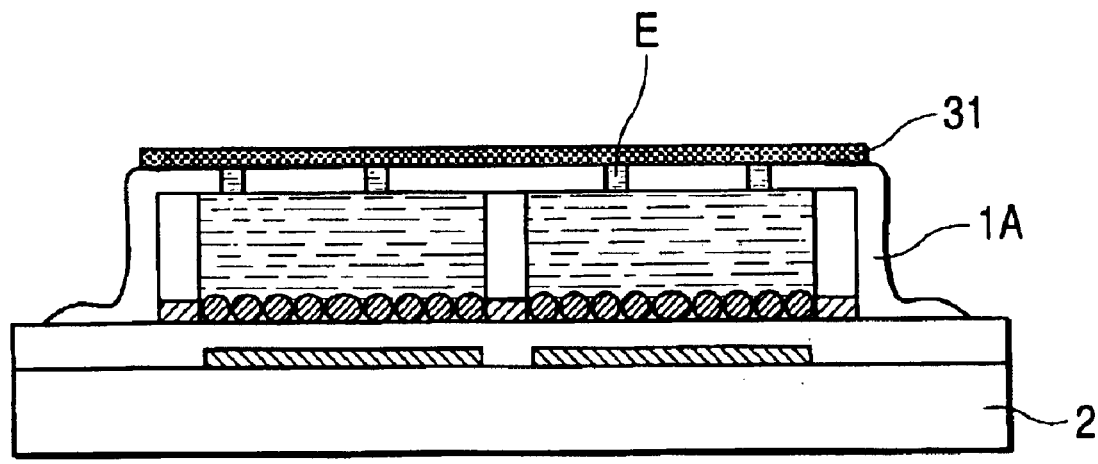

On the other hand, the liquid 4 that flows out of the perforations E when the perforated member 1A is placed on the partition wall members 3 may be removed appropriately. Techniques that can be used for removing the liquid 4 include the following:

a technique of wiping the liquid by means of a highly liquid absorbing material (e.g., cloth);

a technique of arranging a liquid absorbing member 20 on the perforated member 1A as shown in FIGS. 4A and 4B, pushing the latter against the partition wall members 3, removing the liquid 4 flowing out due to the liquid absorbing member 20 and selectively removing the liquid absorbing member; and a technique of arranging liquid absorbing members 30, 31 on the perforated member 1A as two layers as shown in FIG. 5A, pushing the latter against the partition wall members 3, removing the liquid 4 flowing out due to the liquid absorbing members and removing only the liquid absorbing member 30 of the upper layer as shown in FIG. 5B.

For the purpose of the invention, any material that is not dissolved into the liquid 4 may be used for the liquid absorbing member(s). Examples of materials that can be used for the liquid absorbing member(s) include foamed urethane and sufficiently dried paper.

While the perforated member 1A is horizontally placed on the partition wall members 3 in FIG. 3B, the perforated member 1A may be made of a flexible material and placed on the partition wall members 3 in a state other than a horizontal state.

Furthermore, when the perforated member 1A is placed on the partition wall members 3, an electric field may be generated there so as to attract the charged particles 5 toward the second substrate 2. While the polarity to be applied may vary depending on the polarity of the charged particles 5, an alternating current voltage may be applied in place of a direct current voltage so long as it can attract charged particles 5 toward the second substrate 2. Such an electric field may be generated by applying a voltage to the first electrode 6a and the second electrode 6b, by making the perforated member 1A electrically conductive and applying a voltage to it or by using electrodes that are temporarily arranged in the manufacturing process. The perforated member 1A can be made electrically conductive either by using an electrically conductive material (e.g., electrically conductive organic film) for the base member of the perforated member 1A or by placing an electrically conductive layer (e.g., an ITO (indium tin oxide) layer) on an electrically non-conductive base member.

Furthermore, an adhesive agent (e.g., UV-set type adhesive agent) may be applied in advance to the lower surface of the perforated member 1A and bonding the perforated member 1A to the partition wall members 3 by means of the adhesive agent. Alternatively, a material that can be turned to be adhesive may be used for the base member of the perforated member 1A (e.g., film that can be fused by heat).

Care should be taken so that the perforated member 1A and the partition wall members 3 are separated from each other to allow some of the charged particles 5 to flow out before the perforated member 1A is completely bonded to the partition wall members 3.

This embodiment provides the following advantages.

With this embodiment of the invention, the electrically charged particles 5 put into the recesses G of the pixels are effectively prevented from flowing out of the pixels during the manufacturing process (particularly when the pixels are hermetically sealed). Additionally, the concentration of charged particles can be controlled well so that charged particles can be provided accurately on a quantitative basis. As a result, the productivity of manufacturing can be improved remarkably.

As pointed out above, according to the invention, the electrically charged particles 5 put into the recesses G of the pixels are effectively prevented from flowing out of the pixels during the manufacturing process (particularly when the pixels are hermetically sealed). Additionally, the concentration of charged particles can be controlled well so that charged particles can be provided accurately on a quantitative basis. As a result, the productivity of manufacturing can be improved remarkably.

Now, the present invention will be described further by way of examples.

EXAMPLE 1

In this example, an electrophoresic display apparatus (optical modulator) having a configuration as shown in FIGS. 1A and 1B was prepared by way of the manufacturing method illustrated in FIGS. 3A through 3C.

A 0.1 mm thick stainless steel substrate was used for the second substrate 2 and a large number of first electrodes 6a were arranged on the surface thereof to form a matrix. Then, an acrylic resin layer 7 was formed to cover the first electrodes 6a. Aluminum showing a high reflectance was used for the first electrodes 6a and made to operate also as light reflecting/dispersing layer. Second electrodes 6b and partition wall members 3 that are used to define and separate pixels A were formed on the acrylic resin layer 7 and insulating liquid 4 and electrically charged particles 5 were placed in each of the pixels A. The acrylic resin on the first electrodes 6a and the surface of the second electrodes 6b were covered by transparent norbornene resin. The second electrodes 6b of all the pixels were electrically connected to allow them to hold a same electric potential. The partition wall members 3 were made to have a width of 8 $\mu$m and a height of 20 $\mu$m. Isoparaffin (Isopar: tradename, available from Exxon) that was made to contain succinimide (OLOA1200: tradename, available from Chevron) as electric charge control agent was used for the insulating liquid 4 and polystyrene-polymethylmethacrylate copolymer resin particles containing carbon black and having a diameter of about 1 to 2 $\mu$m were used for the electrically charged particles 5. The charged particles 5 showed a negative polarity in the insulating liquid. Each pixel A had dimensions of 240 $\mu$m×80 $\mu$m and a total number of 200×600 pixels were prepared.

Thereafter, a perforated member 1A was lowered slowly from above the insulating liquid 4. The perforated member 1A was made of polycarbonate and had a thickness of 5 $\mu$m. A total of 240 thousands perforations E were cut through the member 1A so that two perforations were allocated to each pixel. Each perforation was made to have a diameter of 1 $\mu$m$\phi$. A UV-set adhesive layer (not shown) with a thickness of 0.1 $\mu$m was formed on the lower surface of the perforated member 1A in advance.

When the perforated member 1A was lowered slowly to a level where it contacted the partition wall members 3, the excessive insulating liquid 4 flowed out onto the perforated member 1A but no charged particles 5 flowed out.

Subsequently, the flowed out insulating liquid 4 was removed and UV rays were irradiated to the adhesive layer. As a result of the UV irradiation, the UV-set adhesive layer on the perforated member 1A was set and the latter was bonded to the partition wall members 3. Then, a blind member 1B was placed on the perforated member 1A and bonded together. A 200 $\mu$m thick PET film having a gas barrier layer was used for the blind member 1B.

In the specimen of the example, the electrically charged particles 5 of each pixel were effectively prevented from moving to some other pixels so that the specimen displayed excellent images.

EXAMPLE 2

In this example, an electrophoresic display apparatus was prepared by way of the manufacturing method illustrated in FIGS. 4A and 4B. The prepared electrophoresic display apparatus had four pixels, each having dimensions of 5 mm×5 mm. The partition wall members 3 had a width of 20 $\mu$m and a height of 30 $\mu$m. A 1.1 mm thick glass substrate was used for the second substrate 2, whereas silver showing a large reflectivity was used for the first electrodes 6a and made to operate also as light reflecting/dispersing layer.

The perforated member 1A of the example was prepared by forming a 0.01 $\mu$m thick transparent ITO electrode layer on a 2 $\mu$m thick member made of norbornene resin. The perforated member 1A was made to have a total of four perforations E so that a single perforation was allocated to each pixel. The perforations had a diameter of 1 mm$\phi$. A foamed urethane plate 20 was placed on the upper surface of the perforated member 1A as liquid absorbing member. Otherwise, the specimen of this example had a configuration same as that of the specimen of Example 1.

To prepare the electrophoresic display apparatus, the perforated member 1A and the foamed urethane plate 20 were lowered slowly from above the insulating liquid 4. As a result, the excessive insulating liquid 4 was absorbed to the foamed urethane plate 20 but no charged particles 5 flowed out.

Subsequently, the foamed urethane plate 20 was removed and a blind member 1B was placed on and bonded to the perforated member 1A. Otherwise, the manufacturing method of Example 1 was followed.

In the specimen of the example, the electrically charged particles 5 of each pixel were effectively prevented from moving to some other pixels so that the specimen displayed excellent images.

EXAMPLE 3

In this example, an electrophoresic display apparatus was prepared by way of the manufacturing method illustrated in FIGS. 5A and 5B. The partition wall members 3 had a width of 5 µm and a height of 20 µm. Otherwise, the specimen of this example was identical with that of Example 1.

The perforated member 1A of the example was prepared by using a 5 µm thick member made of norbornene resin. The perforated member 1A was made to have a total of 600 thousands perforations E so that five perforations were allocated to each pixel. Each perforation had a rectangular profile with dimensions of 10 µm×50 µm. A 0.1 µm thick heat-set type adhesive layer (not shown) was formed on the lower surface of the perforated member 1A in advance. Additionally, a pair of foamed urethane plates 30, 31 was placed on the upper surface of the perforated member 1A as liquid absorbing members. The foamed urethane plates 30, 31 were respectively 1 mm and 100 µm thick.

To prepare the electrophoresic display apparatus, the perforated member 1A and the foamed urethane plates 30, 31 were lowered slowly from above the insulating liquid 4. For this operation, voltages of +10 V and 0 V were applied respectively to the first electrode 6a and the second electrode 6b. As a result, the excessive insulating liquid 4 was absorbed to the foamed urethane plates 30, 31 but no charged particles 5 flowed out.

Subsequently, only the upper foamed urethane plate 30 was removed and the remaining foamed urethane plate 31 was bonded to the partition wall members 3 by heat. Finally, UV-set resin was applied to the foamed urethane plate 31 as a blind member and a plane and smooth surface was produced by means of a bar coater before the resin was set by irradiating UV-rays.

The specimen of this example was as effective as its counterparts of the preceding examples.

EXAMPLE 4

In this example, an electrophoresic display apparatus similar to that of Example 1 was prepared by the following method. The partition wall members 3 of the specimen of this example had a width of 5 µm and a height of 20 µm. When bonding a perforated member 1A to the partition wall members 3 cellulose was applied to the upper surfaces of the partition wall members 3 to a thickness of 5 µm. Electrically charged particles 5 and insulating liquid 4 were supplied by way of a nozzle. The perforated member 1A was made of a flexible material and a total of 240 thousands perforations E were cut through the member 1A so that a pair of perforations was allocated to each pixel. The perforations E had a diameter of 3 µmφ.

When bonding the perforated member 1A, one of the sides thereof was bonded to the second substrate 2 in advance and a press roller was applied to it and moved so as to rotate on it. For this operation, voltages of +10 V and 0 V were applied respectively to the first electrode 6a and the second electrode 6b in order to attract charged particles 5 toward the second substrate 2. As a result, all the charged particles were forced to remain in the recesses so that no charged particles 5 flowed out. Since the cellulose on the upper surfaces of the partition walls repelled insulating liquid 4, the surfaces of the insulating liquid 4 in the recesses were elevated. Thereafter, the perforated member 1A was bonded to the second substrate 2 along the entire periphery thereof and a blind member 1B was bonded to the upper surface of the perforated member 1A. Otherwise, the specimen had a configuration same as that of the specimen of Example 1 and the manufacturing method of Example 1 was followed.

In the specimen of the example, the electrically charged particles 5 of each pixel were effectively prevented from moving to some other pixels so that the specimen displayed excellent images.

EXAMPLE 5

In this example, an electrophoresic display apparatus having a configuration as shown in FIG. 6B was prepared by the following method. The prepared electrophoresic display apparatus had 200×600 pixels, each having dimensions of 103 µm×103 µm. The partition wall members 3 of the specimen of this example had a width of 5 µm and a height of 20 µm. A 0.1 mm thick PET substrate was used for the second substrate 2, whereas aluminum was used for the first electrodes 6a and made to operate also as light reflecting/diffusion layer. Isoparaffin (Isopar: tradename, available from Exxon) that was made to contain succinimide as electric charge control agent was used for the insulating liquid 4 and polystyrene-polymethylmethacrylate copolymer resin particles containing carbon black and having a diameter of about 2 to 3 µm were used for the electrically charged particles 5.

Meanwhile, perforations E were cut through the first substrate 1 so that four perforations were allocated to each pixel (only 1 perforation is shown for each pixel in FIG. 6A). Each perforation was made to have a diameter of 1 µmφ. The first substrate 1 was made of transparent silicone resin and it had perforations E in a state where it was not soaked with isoparaffin of insulating liquid 4 (in other words, before it was soaked) but the first substrate 1 swelled as it was soaked with isoparaffin so that the perforations E closed by themselves with time (see FIGS. 6A and 6B).

Differently stated, in this example, the first substrate 1 was made to operate both as perforated member and as blind member (the perforated member and the blind member were same and identical).

Firstly, a large number of first electrodes 6a were arranged on the surface of the second substrate 2 to form a matrix and an acrylic resin layer 7 was formed to cover the first electrodes 6a. As in the case of Example 1, second electrodes 6b and partition wall members 3 were formed on the surface of the acrylic resin layer 7 and insulating liquid 4 and charged particles 5 were placed in each pixel. The acrylic resin 7 on the first electrodes 6a and the surface of the second electrodes 6b were covered by transparent norbonene resin.

Thereafter, the first substrate 1 having perforations E was lowered slowly from above the insulating liquid 4 (see FIG. 6A). Then, the excessive insulating liquid 4 gradually came out onto the upper surface of the first substrate 1 but no charged particles 5 flowed out. When about an hour had elapsed, while appropriately removing the excessive liquid, the perforations E of the first substrate 1 were found to have closed by themselves (see FIG. 6B).

After the closure of the perforations E, the excessive insulating liquid 4 remaining on the surface of the first substrate 1 was removed neatly and the surface was dried.

Since the charged particles in each pixel of the specimen of this example were prevented from moving into some other pixels during the preparing process and the distribution of charged particles in the initial stages of injection was maintained, the display apparatus displayed high quality images, effectively suppressing spots.

What is claimed is:

1. An optical modulator comprising a first substrate, a second substrate arranged with a predetermined gap interposed between itself and the first substrate, partition wall members partitioning pixels arranged between the substrates, a liquid and a plurality of electrically charged particles arranged at each of the pixels, and first and second electrodes arranged at each of the pixels, the charged particles being adapted to be moved to display an image or operate for optical switching as a result of application of a voltage between the electrodes of each pixel, wherein the first substrate is formed by combining a perforated member having perforations and arranged so as to be held in contact with the partition wall members, the perforations allowing passage of the liquid while obstructing passage of the particles, and a blind member arranged so as to close the perforations.

2. The optical modulator according to claim 1, wherein the first substrate operates both as the perforated member and as the blind member.

3. The optical modulator according to claim 1, wherein one or more than one perforations of the perforated member are allocated to each pixel.

4. The optical modulator according to claim 1, wherein the perforated member and the blind member are transparent and their refractive indexes are substantially equal to each other.

5. The optical modulator according to claim 4, wherein the difference of the refractive index of the perforated member and that of the blind member is not greater than 0.1.

6. The optical modulator according to claim 1, wherein the perforated member has a thickness smaller than the height of the partition walls.

7. A method of manufacturing an optical modulator comprising a first substrate, a second substrate arranged with a predetermined gap interposed between itself and the first substrate, partition wall members partitioning pixels arranged between the substrates, a liquid and a plurality of charged particles arranged at each of the pixels, and first and second electrodes arranged at each of the pixels, said method comprising:

a step of forming the partition wall members on the second substrate;

a step of placing the liquid and the electrically charged particles in recesses defined by the second substrate and the partition wall members;

a step of placing a perforated member on the partition wall members to confine the charged particles in the recesses; and a step of arranging a blind member so as to close the perforations of the perforated member.

8. The method according to claim 7, wherein the perforated member is placed on the partition walls with a liquid absorbing member provided on the upper surface thereof, and the liquid flowing out from the recesses is removed by the liquid absorbing member.

9. The method according to claim 7, wherein an adhesive agent is applied in advance to the perforated member and the perforated member is bonded to the partition walls by means of the adhesive agent.

10. A method of manufacturing an optical modulator comprising a first substrate, a second substrate arranged with a predetermined gap interposed between itself and the first substrate, partition wall members partitioning pixels arranged between the substrates, a liquid and a plurality of charged particles arranged at each of the pixels, and first and second electrodes, the material of the first substrate being so selected as to bear perforations in a state of being not soaked with the liquid but close the perforations in a state of being soaked with the liquid, said method comprising:

a step of forming the partition wall members on the second substrate;

a step of placing the liquid and the electrically charged particles in recesses defined by the second substrate and the partition wall members;

a step of placing the first substrate in a state of bearing perforations on the partition wall members to confine the charged particles in the recesses; and a step of closing the perforations as a result of causing the first substrate placed on the partition walls to be soaked with the liquid.

11. The method according to claim 10, wherein the perforated member is placed on the partition walls with a liquid absorbing member provided on the upper surface thereof and the liquid flowing out from the recesses is removed by the liquid absorbing member.

12. The method according to claim 10, wherein an adhesive agent is applied in advance to the perforated member, and the perforated member is bonded to the partition walls by means of the adhesive agent.

* * * * *

UNITED STATES PATENT AND TRADEMARK OFFICE
CERTIFICATE OF CORRECTION

PATENT NO. : 6,816,303 B2
DATED : November 9, 2004
INVENTOR(S) : Nobutaka Ukigaya It is certified that error appears in the above-identified patent and that said Letters Patent is hereby corrected as shown below:

Column 5,
Line 25, "optical" should read -- an optical --.
Line 26, "an" should be deleted.

Column 8,
Line 16, "thousands" shoud read -- thousand --.

Column 9,
Lines 18 and 55, "thousands" should read -- thousand --.

Signed and Sealed this

Thirty-first Day of May, 2005

JON W. DUDAS
*Director of the United States Patent and Trademark Office*